United States Patent [19]

Connolly

[11] Patent Number: 4,555,055

[45] Date of Patent: Nov. 26, 1985

[54] METHOD OF MAKING CENTRIFUGE SCREEN BASKETS

[76] Inventor: James D. Connolly, P.O. Box 1238, Princeton, W. Va. 24740

[21] Appl. No.: 638,855

[22] Filed: Aug. 8, 1984

Related U.S. Application Data

[62] Division of Ser. No. 405,928, Aug. 6, 1982.

[51] Int. Cl.$^4$ ............................................. B23K 31/02
[52] U.S. Cl. .................................. 228/155; 228/173.5; 29/163.5 R
[58] Field of Search ...................... 228/155, 173.5, 182; 29/163.5 R, 163.5 F; 140/112

[56] References Cited

U.S. PATENT DOCUMENTS

| | | | |
|---|---|---|---|
| 3,238,610 | 3/1966 | Berg | 228/155 |
| 3,425,561 | 2/1969 | Steele et al. | 29/163.5 R |
| 4,188,700 | 2/1980 | Rymer | 29/163.5 R |
| 4,221,951 | 9/1980 | Connolly | 140/112 X |

FOREIGN PATENT DOCUMENTS 2033242  5/1980  United Kingdom ............ 210/380.1

Primary Examiner—Kenneth J. Ramsey
Attorney, Agent, or Firm—Wilmer Mechlin

[57] ABSTRACT

A method of making a frusto-conical centrifuge screen basket of side-connected segments formed of wedge-shaped screen wires connected and backed by tie bands welded thereto, in which the segments are each fabricated in the flat by clamping laterally spaced screen wires to a flat work surface and fusion welding laterally spaced tie band sections to the screen wires, and the tie band sections are so precurved and positioned during welding as to form in the finished basket a plurality of laterally spaced parallel continuous circumferential tie bands each centered on and perpendicular to the basket's axis and together reinforcing the basket against centrifugal forces imposed in service.

3 Claims, 4 Drawing Figures

METHOD OF MAKING CENTRIFUGE SCREEN BASKETS

This application is a division of my copending application Ser. No. 405,928, filed Aug. 6, 1982 for a Frusto-Conical Screen Basket.

SUMMARY OF THE INVENTION

The primary object of the present invention is to provide a method of making frusto-conical screen baskets of a plurality of side-connected segments formed of wedge-shaped screen wires backed and connected by tie bands in which the segments are fabricated in the flat and the tie bands in the finished basket are effective reinforcements against centrifugal forces.

Another object of the invention is to provide a method of making a frusto-conical screen basket of a plurality of side-connected segments of laterally spaced wedge-shaped screen wires backed by laterally spaced tie bands in which the segments are each initially fabricated in the flat by clamping a plurality of laterally spaced screen wires to a flat work surface by a plurality of radially spaced guide bars anchored at opposite ends to the surface and having concentric cylindrical inner and outer faces, inserting in each space between adjoining guide bars a flat tie band section having concentric cylindrical inner and outer edges, the outer edge conforming to the confronting inner face of the guide bar at the outside of the space, and each tie band section is welded along an inner edge to backs of underlying screen wires by a welding tool traversing the space toward an unanchored end of the tie band section and in its traverse guided on an outer face of the guide bar at the inside of the space.

Other objects and advantages of the invention will appear hereinafter in the detailed description, be particularly pointed out in the appended claims, and be illustrated in the accompanying drawings, in which:

FIGURE DESCRIPTION

DETAILED DESCRIPTION

Figure 1:
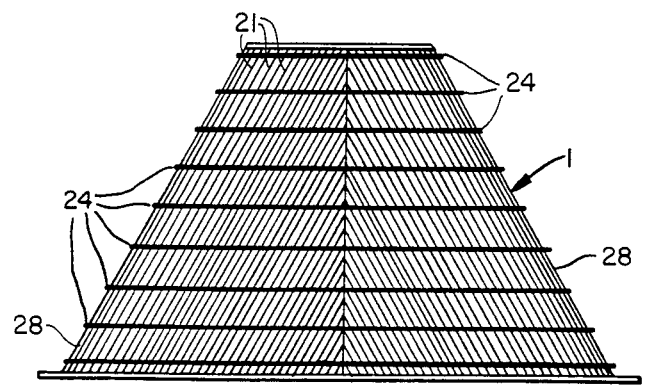
FIG. 1 is a side elevational view of a segmented frusto-conical screen basket made in accordance with the method of the present invention.
Figure 2:
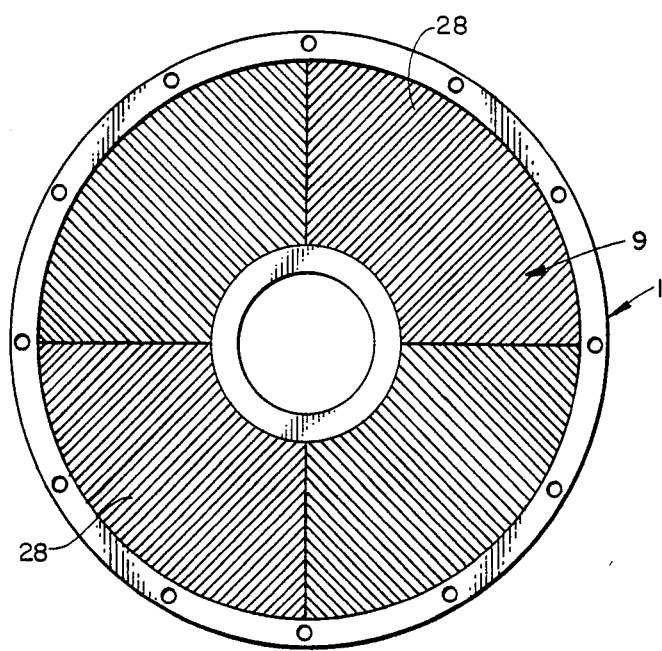
FIG. 2 is a bottom plan view of the basket of FIG 1.
Figure 3:
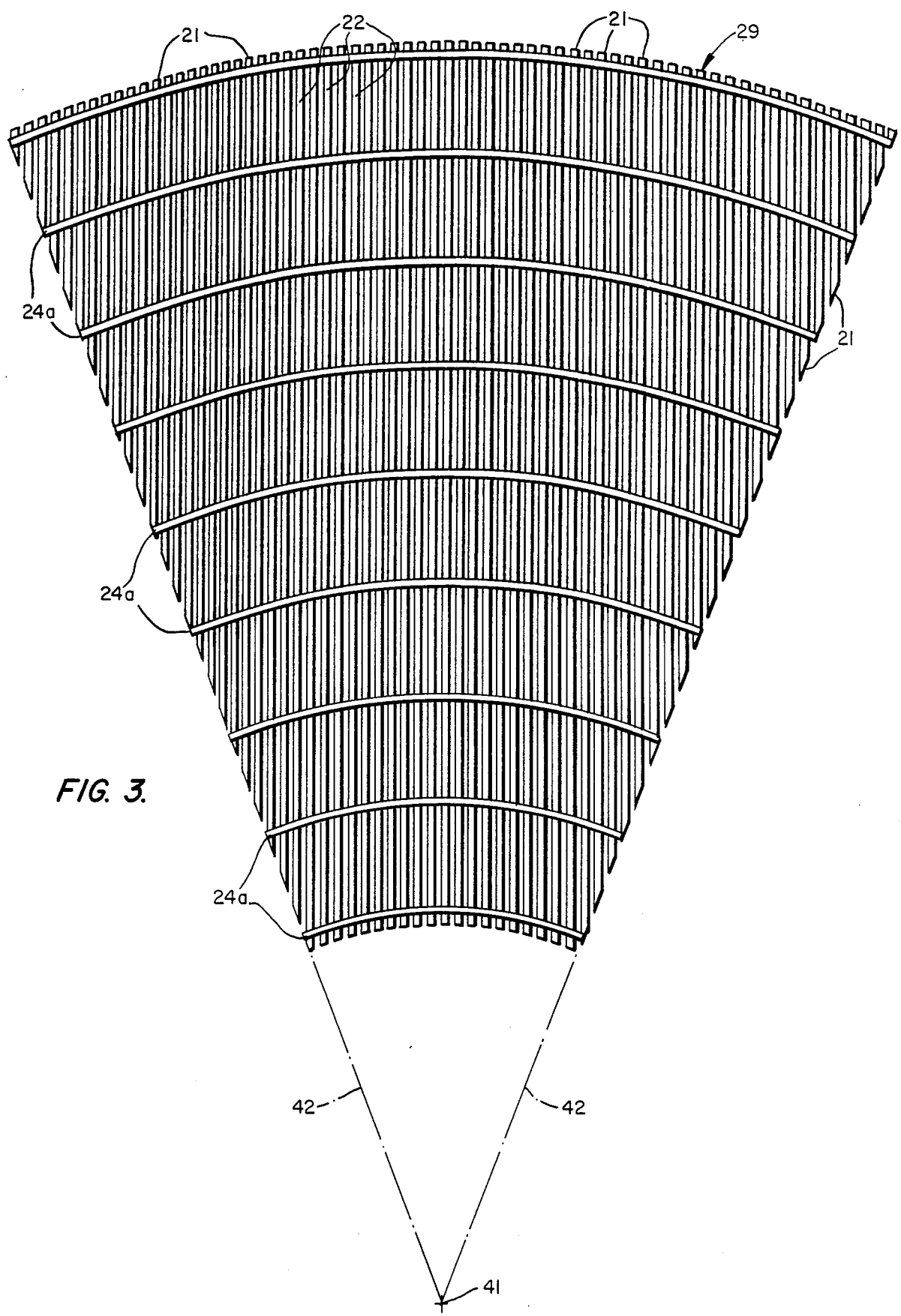
FIG. 3 is a planar projection on an enlarged scale of one of the segments of the basket of FIG. 1 after the tie bands have been welded to the screen wires and before the segment has been bent to its final conical shape.
Figure 4:
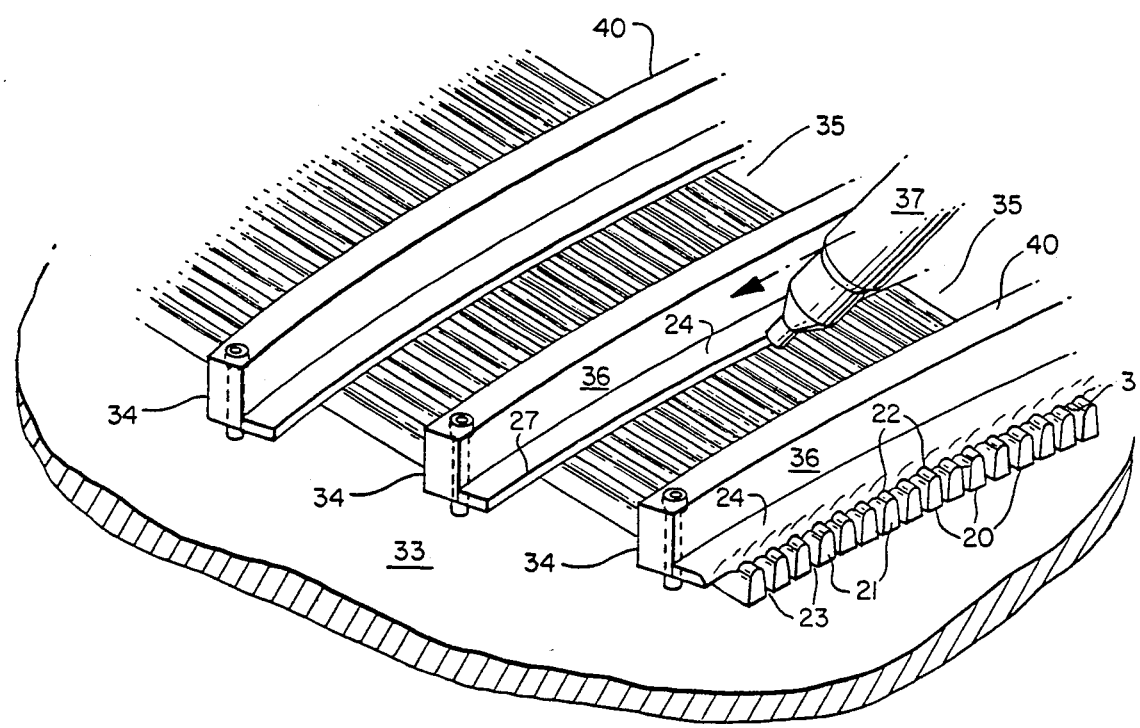
FIG. 4 is a fragmentary perspective view showing on a further enlarged scale a part of the segment of FIG. 3 during welding of the tie bands to the screen wires.

The improved method of the present invention of making centrifuge screen baskets is particularly designed for making vertically or axially segmented frusto-conical screen baskets such as the exemplary basket 1 of FIG. 1.

Formed of vertically or axially extending, conically curved or conical segments 28 welded together along adjoining sides and which, as in the illustrated basket 1, suitably may be counterpart or identical quarter segments, the basket has an internal screening surface 9 formed by desirably flat faces or bases 20 of vertically extending wedge-shaped profile screen wires or rods 21, which in each segment preferably are parallel and laterally equally spaced by longitudinally coextensive slots 23 of inverted V-shape. With initially somewhat rounded backs or outer edges 22, the screen wires 21 of the product or finished basket 1 are connected and externally backed by a plurality of vertically or axially spaced parallel circumferential tie bands 24 welded at intersections to the backs of the screen wires and each centered on and perpendicular or normal to the basket's axis.

In making the screen basket 1 in accordance with the method of the present invention, each of the segments 28 is initially fabricated or formed as a generally sectoral planar substantial projection or reproduction 28 of its final conical shape by clamping a plurality of inverted or face-down screen wires 21 in parallel and equally spaced relation to a flat work surface 33 by a plurality of guide bars 34 bolted or otherwise releasably anchored at ends to the work surface and having concentric cylindrically curved concave inner and convex outer faces 36 and 40, respectively, each struck about the intersection, indicated at 41, of converging radial lines or, more precisely, planes 42 demarking the projection's sides. With the screen wires 21 so clamped and the guide bars 34 preferably equally radially spaced, there is inserted in each of the spaces 35 between adjoining guide bars a flat precurved section or segment 24a of appropriate length of a corresponding tie band 24 having parallel cylindrically curved concave inner and convex outer edges 25 and 26, respectively, the latter or outer of which is coradial and concentric with the inner face 36 of the guide bar at the outside of the particular space.

Fitted against the inner face 36 of the outside guide bar 34 with at least one end loose or unanchored, each tie band section 24a is fusion, as opposed to resistance, welded along an inner edge 25 to the backs 22 of underlying screen wires 21 by a welding torch or tool 37 traversing the particular space 35 toward the free or unanchored end of the section. The welding torch 37 in its traverse is guided by or tracks against the outer face 40 of the inside guide bar 34.

In its traverse of each space 35 containing a tie band section 24a, the welding torch 37 heats the tie band section and the outside guide bar 34 and causes both to expand, the expansion of the guide bar being particularly pronounced if, as preferred, it is composed of a metal of high heat conductivity, such as aluminium. Since the guide bar 34 is anchored at both ends, its expansion causes it to flex outwardly between its ends away from the tie band section 24a, while the section, since unanchored at its end toward which the torch is traversing, tends to flex inwardly at that end toward the inside guide bar. As the inside guide bar is not heated during the traverse, it maintains its original shape and ensures that the tie band section, when welded, will be parallel and coaxial with the inside guide bar and also the outside guide bar when the latter has cooled.

The above welding operation is repeated for each of the remaining tie band sections 24a until all have been welded in place, whereupon the sectoral projections 28 are cut or trimmed in the flat to size and bent approximately to final conical shape. So separately formed, the several segments are then inserted in a suitable conical fixture where they are bent by internal pressure to final shape and fusion welded at sides to adjoining segments at least externally, preferably by tig (tungsten—inert gas) welding, and, for added strength, also preferably internally, suitably by mig (consumable metal—inert gas) welding. The external welding also welds adjoining ends of the tie band sections 24a to each other and the radial plane intersection 41 about which the guide bar faces 36 and 40 and thus necessarily the tie band section edges 25 and 26 are struck, on bending of the segments to final conical shape, coincides with or becomes part of the axis of the product or finished basket 1. Since the radial spacing of the tie band sections 24a from the intersection 41 were predetermined, in the final basket the initially flat tie band sections become the final or finished continuous circumferential tie bands 24, parallel and of predetermined vertical spacing and each centered on and perpendicular to the basket's axis.

From the above detailed description, it will be apparent that there has been provided an improved method of making a vertically segmented frusto-conical screen basket by which each segment is enabled to be fabricated in the flat of screen wires and tie band sections and nonetheless provide the finished or product basket with effective external reinforcement in the form of continuous vertically spaced parallel tie bands concentric with and perpendicular to the basket's axis. It should be understood that the described and disclosed embodiment is merely exemplary of the invention and that all modifications are intended to be included that do not depart from the spirit of the invention and the scope of the appended claims.

Having described my invention, I claim:

1. A method of making a frusto-conical centrifuge screen basket of side-connected segments formed of wedge-shaped screen wires connected and backed by tie bands welded thereto, comprising fabricating each segment in the flat by clamping laterally spaced screen wires to a flat work surface and fusion welding laterally spaced tie band sections to said screen wires, and so precurving and during welding positioning said tie band sections as to form in the finished basket a plurality of laterally spaced continuous circumferential tie bands each centered on and perpendicular to the basket's axis.

2. A method according to claim 1 wherein each segment is fabricated in the flat as a planar sectoral projection of its finished frusto-conical shape, the screen wires are clamped to the work surface by radially spaced guide bars each anchored at ends to the work surface and having inner and outer cylindrical faces struck about an intersection of radial planes bounding said projection, each tie band section is inserted in a space between an adjoining pair of guide bars and has cylindrical inner and outer edges coaxial with said guide bar sides, and with at least one end unanchored and an outer edge initially engaging an inner face of the guide bar at the outside of the related space welding each tie band section along an inner edge to underlying screen wires by welding means traversing said space toward said unanchored end of said section.

3. A method according to claim 2, wherein the welding means in welding each tie band section to underlying screen wires is guided by a confronting inner face of the guide bar at the inside of the space in which the section is inserted.

* * * * *